Figure 1:
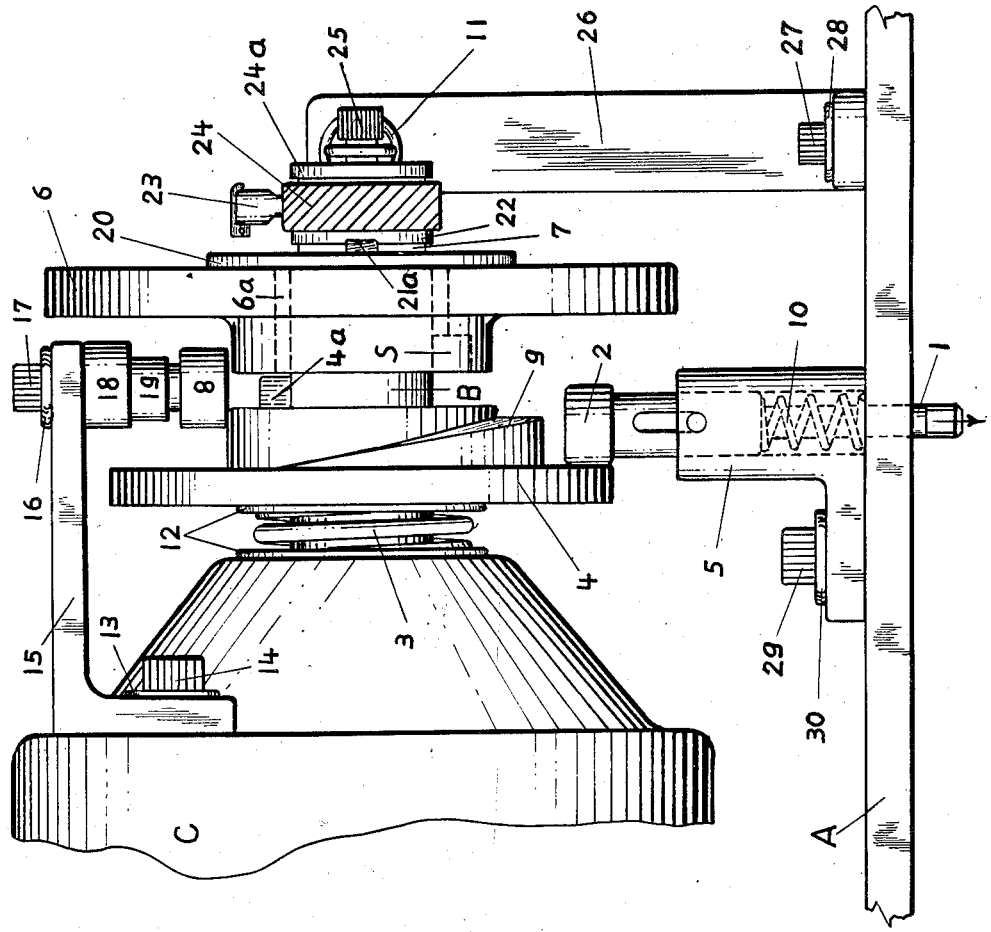

Feb. 19, 1957  F. F. WALZ  2,781,880
INTERMITTENT CLUTCH
Filed May 12, 1952  2 Sheets-Sheet 1

FREDERIC F. WALZ, INVENTOR.

BY
John C. McGregor
ATTORNEY

Feb. 19, 1957   F. F. WALZ   2,781,880
INTERMITTENT CLUTCH
Filed May 12, 1952   2 Sheets-Sheet 2
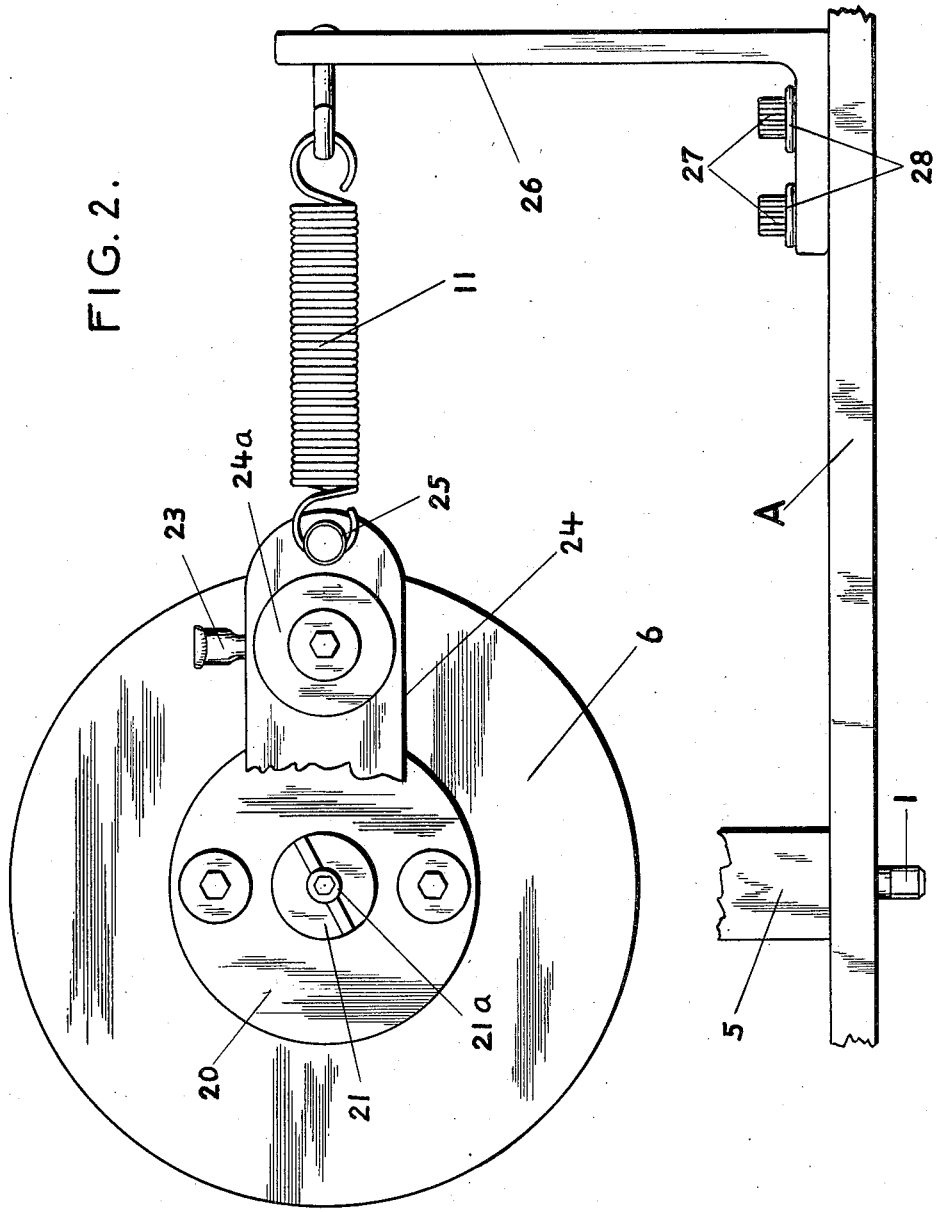
FREDERIC F. WALZ, INVENTOR.
BY John C. McGregor
ATTORNEY

2,781,880

INTERMITTENT CLUTCH

Frederic F. Walz, Bayside, N. Y.

Application May 12, 1952, Serial No. 287,431

2 Claims. (Cl. 192—33)

This invention relates to clutch mechanisms and more particularly to clutch mechanisms for imparting intermittent motion:

It is a principal object of this invention to provide a clutch mechanism whereby the power output of the prime mover is intermittently supplied to the load in accordance with a control impulse.

A further object of this invention is to provide a positive declutching of the output from the prime mover after the introduction of the control impulse.

A still further object of the present invention is to provide a clutch mechanism which provides for a positive clutching action.

An additional object of the present invention is to provide a clutch mechanism whose power output motion is constrained until there is a positive interlock between the input shaft and the output shaft.

It is a further object of the present invention to provide a clutch mechanism which is simple and durable, which is effective for its intended purposes and which can be economically manufactured.

Another object of the present invention is to provide a clutch mechanism whose output shaft is constrained in rotation after declutching.

An additional object of the present invention is to provide a clutch mechanism which permits positive declutching subsequent to the release of the control impulse.

A still further object of the present invention is to provide a clutch mechanism adapted to impart 360° of rotation of the output shaft for each control impulse.

Other objects and novel features of the invention will appear more fully hereinafter from the following detailed description when taken in connection with the accompanying drawings. It is to be expressly understood, however, that the drawings are employed for illustrative purposes only and are not designed as a definition of the limits of the invention, reference being had for this purpose to the appended claims.

In the drawings:

Figure 1 is a side elevation view of a clutch mechanism constructed in accordance with the present invention; and Figure 2 is a fragmentary end view.

Referring more in detail to the accompanying drawings, there is illustrated in Figure 1 a bottom plate A upon which is supported a prime mover (not shown) having a drive shaft B enclosed in housing C. Clutch disc 4 is keyed to and supported on drive shaft B. Compression spring 3 acting on thrust collars 12 forces clutch disc 4 away from housing C. Output disc or crank 6, which is also supported by drive shaft B, is free to rotate relative thereto. Cover plate 20 attached to the end of drive shaft B by flat head screw 21, shown in Figure 2, retains crank 6 on drive shaft B. A lubricating plug 21a is provided on the end of the shaft B to assure lubrication and freedom of motion of crank 6 on shaft B.

Spline member 4a extends axially from the hub of clutch disc 4 toward the opposite face of crank 6. The hub of crank 6 has a spline way S cut therein for receiving the spline 4a.

Surrounding the hub of clutch disc 4 is a cam surface 9 which extends for approximately 90° of rotation; although the precise length thereof is not critical nor important to the operation of the present invention.

Slip bearing block 5 is mounted on bottom plate A beneath clutch disc 4. The slip bearing block 5 is generally an L shaped member with its horizontal branch attached to the bottom plate A by means of retaining screw 29 and washer 30. The vertical portion of the L shaped slip bearing block 5 has a bore provided therein which also extends through the bottom plate A. Mounted in the upper end of said bore is cam follower 2 which is connected to actuating rod 1 which passes through the bore in bottom plate A. Return spring 10 opposes displacement of the actuating rod 10 and forces the cam follower vertically into engagement with clutch disc 4. Pin 5a passing through a longitudinal slot in cam follower 2 is supported by the slip bearing block 5. The pin 5a prevents spring 10 from forcing the cam follower 2 completely out of the bearing block 5.

Cam follower 8 which rides on cam 9 is supported by cam follower support 15 attached to housing C by screw 15 and washer 13. The cam follower 8 is positioned from the end of support 15 by space 18 and bearing 19. Screw 17 and washer 16 maintain cam follower 8 in this position.

Connecting link 24 is attached to the outer face of crank 6 through crank pin 7 and bearing 22. Cover plate 24a retains the connecting link in its position. Oil cup 23 is provided on connecting link 24 to assure lubrication of the bearing 22.

Articulating spring 11 is connected between pin connection 25 on the connecting link 24 and upright support 26, which is attached to the base plate A by means of screws 27 and washers 28.

In order to understand the operation of my invention I will describe its workings through one cycle. Let us consider that shaft B is in rotation as the result of power passing from the prime mover, not shown, enclosed within housing C. Clutch disc 4 which is keyed to the drive shaft B, is also in rotation. Spring 3 is attempting to force the clutch plate into engagement with the crank 6. However, this is prevented by the intervention of cam follower 2.

In response to a control impulse or force actuating rod 1 is displaced against the force of expansion or return spring 10. This causes the cam follower 2 to be displaced permitting spring 3 to act against clutch plate 4 tending to displace it longitudinally towards crank 6.

However, spline 4a butts against the face of the hub of crank 6. Spring 11 retains crank 6 from rotation caused through friction. As clutch plate 4 continues to rotate under the action of drive shaft B, cam follower 8 engages cam surface 9. This engagement forces clutch plate 4 away from crank 6. The continual engagement of cam follower 8 on cam 9 forces clutch plate 4 further away from crank 6 at the same time compressing spring 3.

After cam follower 8 passes the high on cam 9 the compression of spring 3 is relieved permitting clutch plate 4 to be urged toward crank 6. This permits spline 4a to enter spline way S, permitting positive locking of clutch plate 4 and crank 6.

It should be noted that the operator can now remove the control force from the actuating rod 1. Return spring 10 will force cam follower 2 vertically. However, since clutch plate 4 has now been longtiudinally displaced by the action of compression spring 3, cam follower 2 will engage the rim of clutch disc 4 rather than the face.

As clutch disc 4 continues to rotate cam follower 8 again comes into contact with cam 9. The engagement of the cam 9 with cam follower 8 causes clutch disc 4 to separate from crank 6. This displacement continues until spline 4a is completely withdrawn from spline way S, disengaging clutch disc 4 from crank 6.

In addition to causing disengagement, the displacement of the clutch disc 4 permits the cam follower 2 to pass beyond the edge of the rim of clutch disc 4 and engage its face.

The intervention of the cam follower 2 prevents the clutch plate 4 from moving under the urging of spring 3 after the cam follower 8 again passes the high of cam 9. This provides positive and continued declutching until the introduction of another control force. As soon as spline 4a is completely withdrawn from spline way S, spring 11 pulls crank 6 into engaging area for the next cycle.

Having gone through a cycle of operation, the device is now ready for the introduction of a control force on actuating rod 1 to start the cycle again. Until such control force is applied, however, no force is transmitted to crank 6.

In order to prevent the rotation of crank 6 due to the friction between bearing 6a and drive shaft B, crank 6 is restrained from rotating by articulating spring 11. This assures the fact that rotation of crank 6 does not commence until spline 4a enters spline way S at which time clutch disc 4 and crank 6 are positively engaged. Furthermore, spring 11 constrains the motion of crank 6 after disengagement of clutch disc 4.

From the above detailed description of the invention, it is believed that the construction and operation thereof will be apparent. It is believed that not only does the present invention provide a clutch mechanism whose power output is intermittent, but one in which there is positive clutching and declutching. The clutching action of the present invention follows the introduction of a control force, and motion of the output shaft is constrained until there is complete and positive clutching action. In addition the invention provides positive and continued declutching after the release of the control force.

While the invention has been disclosed and described herein with considerable particularity, it is to be understood that the invention is not restricted thereto as the same is capable of receiving a variety of mechanical expression, some of which will now readily suggest themselves to those skilled in the art, while changes may be made in the details of construction, arrangement and proportion of parts, and certain features used without others, without departing from the spirit of the invention. Reference is, therefore, to be had to the claims hereto appended for a definition of the limits of the invention.

What is claimed is:

1. An intermittent clutch comprising a drive shaft, a clutch plate connected to said drive shaft and adapted to move longitudinally thereof, a clutch tooth rigidly attached to said clutch plate, an output crank supported by said driveshaft and free to rotate relative thereto, said output crank having a spline way cut therein to release said tooth, a cam surface attached to the face of said clutch plate, a cam guide rigidly supported relative to the longitudinal axis of said drive shaft, locking means adapted to move normal to the longitudinal axis of said drive shaft, a connecting link attached to said crank, and indexing means connected to said connecting link.

2. An intermittent clutch comprising a drive shaft, a clutch plate connected to said drive shaft and adapted to move longitudinally thereof, selective connecting means comprising a clutch tooth rigidly attached to said clutch plate, and output crank supported by said drive shaft, said output crank having a spline way cut therein to receive said tooth a spring adapted to force said clutch plate and said crank into engagement, a cam surface attached to the face of said clutch plate, a guide adapted to ride on said cam, triggered lock means adapted to ride on said clutch plate, and means for indexing said crank.

References Cited in the file of this patent
UNITED STATES PATENTS

| | | |
|---|---|---|
| 2,011,629 | Hahnemann et al. | Aug. 20, 1935 |
| 2,226,917 | Zeruneith | Dec. 31, 1940 |
| 2,432,483 | Miller et al. | Dec. 9, 1947 |